United States Patent [19]

Shiraiwa et al.

[11] 4,019,562
[45] Apr. 26, 1977

[54] AUTOMATIC MOLDING APPARATUS WITH MEANS FOR CONTROLLING POURING RATE

[75] Inventors: Toshio Shiraiwa; Sumio Kobayashi, both of Amagasaki; Katsukiyo Marukawa; Syoji Anezaki, both of Ibaragi, all of Japan

[73] Assignee: Sumitomo Metal Industries, Ltd., Osaka, Japan

[22] Filed: Oct. 15, 1975

[21] Appl. No.: 622,730

[30] Foreign Application Priority Data

Nov. 21, 1974  Japan ............................ 49-134506

[52] U.S. Cl. .................... 164/155; 141/95; 164/133; 343/8; 343/7 ED
[51] Int. Cl.² ...................................... B22D 37/00
[58] Field of Search .............. 164/4, 133, 154, 155; 73/290 V; 343/8, 7 ED; 425/145, 147; 141/95

[56] References Cited

UNITED STATES PATENTS

| 2,753,605 | 7/1956 | Carleton | 164/155 |
| 3,599,835 | 8/1971 | Kocks | 164/155 X |

Primary Examiner—Robert D. Baldwin
Attorney, Agent, or Firm—Wenderoth, Lind & Ponack

[57] ABSTRACT

In an automatic molding apparatus, a Doppler speed meter is used to detect the rising speed of molten metal within a mold, and a nozzle stopper attached to a ladle in which the molten metal is contained is actuated in response to a difference between a detected speed signal and a speed pattern signal to control the opening of the nozzle of the ladle whereby the rising speed of the molten metal fed from the ladle to the mold through the nozzle can be controlled in accordance with an optimum molding velocity pattern.

12 Claims, 17 Drawing Figures

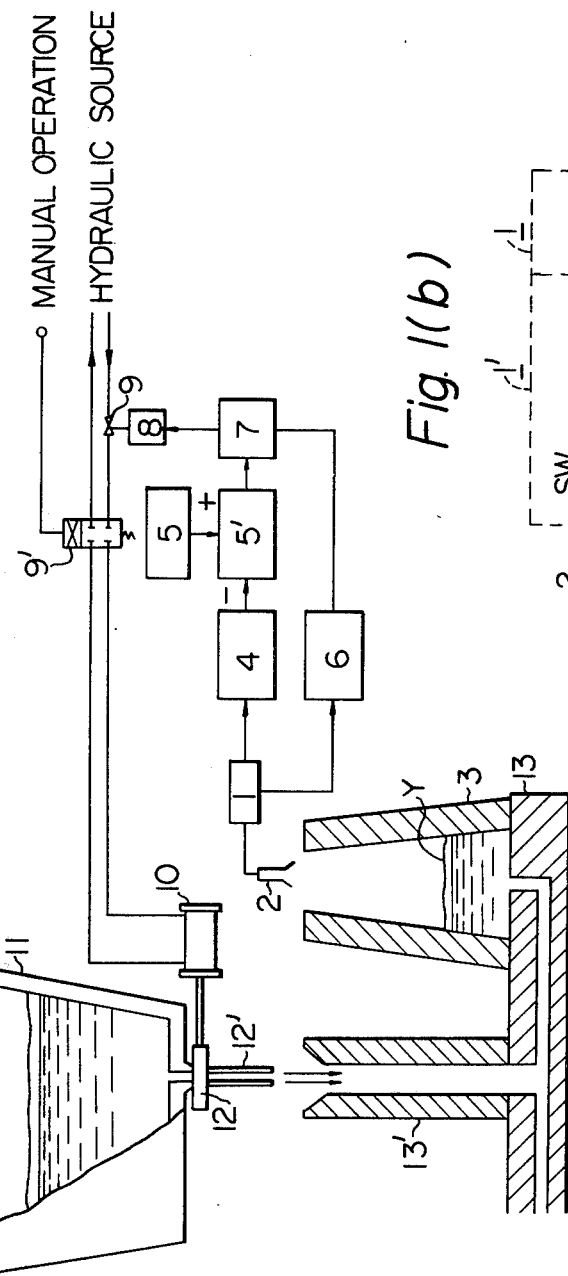
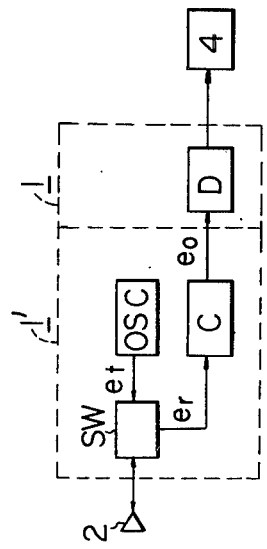
Fig. I(a)
Fig. I(b)

AUTOMATIC MOLDING APPARATUS WITH MEANS FOR CONTROLLING POURING RATE

BACKGROUND OF THE INVENTION

1. Field of the Invention

The invention relates to an automatic molding apparatus and more particularly to an automatic molding apparatus capable of detecting the rising speed of molten metal within a mold and controlling it in accordance with an optimum molding speed pattern.

2. Description of the Prior Art

A conventional molding method is effected by manual operation of an operator for adjusting total molding times. In this case, the rising speed of a molten metal within a mold has a significant relationship to cracks occurring at the surface of an ingot thereof, but heretofore there has been no method for accurately detecting it. Further, the quantitative relation between the rising speed of the molten metal and the ingot has not been made clear and the effective control of said raising speed of the molten metal can not be attained.

SUMMARY OF THE INVENTION

An object of the invention is to provide an automatic molding apparatus provided with means for detecting the rising speed of the molten metal, i.e. the speed of increase of the level of the molten metal.

Another object of the invention is to provide an automatic molding apparatus including means for detecting the rising speed of the molten metal and means for detecting the height of the surface of the molten metal.

A further object of the invention is to provide an automatic molding apparatus comprising a digital circuit suitable as means for detecting the rising speed of the molten metal.

A still further object of the invention is to provide an automatic molding apparatus having a digital circuit for detecting the rising speed of the molten metal wherein the delay of a digital signal representative of a detected rising speed thereof is compensated in controlling the rising speed of the molten metal by the digital signal.

A still another object of the invention is to provide an automatic molding apparatus including means for generating an optimum molding speed pattern signal to control the rising speed of the molten metal.

In order to accomplish the above objects, the basic arrangement of an automatic molding apparatus according to the invention comprises means for detecting the rising speed of the molten metal in a manner non-contacting thereto; means for generating a desired molding speed pattern signal and means for controlling the rising speed of the molten metal fed from a ladle into a mold in response to a difference between the detected speed signal and the speed pattern signal.

BRIEF DESCRIPTION OF THE DRAWINGS

FIGS. 1(a) and (b) are diagrams showing the arrangement of an embodiment of an automatic molding apparatus according to the invention.

DESCRIPTION OF THE PREFERRED EMBODIMENT

FIG. 1(a) shows an embodiment of an automatic molding apparatus according to the invention wherein the invention is applied to the event that, for example, molten metal is poured from a ladle 11 filled with it through a nozzle 12' and further via a pouring path 13', a molding path 13 into a mold 3. In FIG. 1(b), numeral 1 indicates an apparatus for detecting the rising speed of the molten metal within the mold 3, for example, a so-called "microwave Doppler speed meter" utilizing Doppler effect of a microwave. (For example, with respect to a microwave Doppler radar see "The microwave journal," July, 1963 pages 45 to 51)

Figure 2:
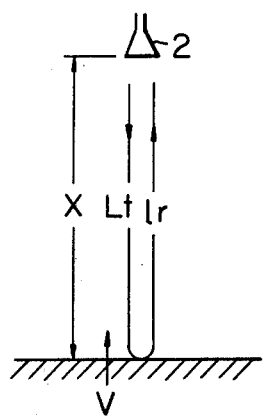
FIGS. 2 and 3 are diagrams explaining the operation of such apparatus.

The principal of said Doppler speed meter is as follows:

As shown in FIG. 2, when a transmitted microwave $e_t$ from an antenna 2 is indicated by the following equation, $$e_t = E_t \cos \omega t = E_t \cos 2\pi f t \qquad (1)$$

a reflected wave $e_r$ from the surface of molten metal delays by a transmission time $\zeta$ as compared to the transmitted wave.

$$\zeta = 2X/C \qquad (2)$$

Accordingly, $e_r$ may be represented by the following equation, $$e_r = E_r \cos 2\pi f (t-\zeta)$$

where X is a distance between the meter and the surface of the molten metal and C is a microwave transmission speed.

By combining a part of the transmitted wave $e_t$ and the reflected wave $e_r$, the following output $e_o$ is obtained.

$$e_o = E_o \cos(2\pi f + \phi) + E_1 \qquad (4)$$

In this case, the frequency $f_d$ of output $e_o$ (a Doppler frequency) may be indicated by the following equation, where $\lambda$ is the wave length of the microwave, $\phi$, $E_r$, $$f_d = \frac{d}{dt}(f\zeta)$$
$$= 2\frac{f}{c}\frac{dt}{dx} \quad (5)$$
$$= \frac{2v}{\lambda}$$

$E_t$ and $E_o$ are constants.

It is found from the equation (5) that frequency $f_d$ is proportional to the rising speed $v$ of molten metal $$\left(v = \frac{dx}{dt}\right).$$

namely, it is possible to know rising speed $v$ by detecting Doppler frequency $f_d$. Further, the distance can be known by integrating the speed. In addition a microwave is utilized on the ground of its quick response and little deterioration due to high temperature dust, powder dust, humidity or the like. Also a microwave radar may be used in place of the microwave Doppler speed meter.

In this way, a microwave is transmitted from the antenna 2 of a detecting apparatus 1 to the surface Y of the molten metal within the mold 3 and then a reflected wave therefrom is received by antenna 2 to detect the Doppler frequency in apparatus 1. The output signal of apparatus 1 is applied to a converter 4 for providing a speed signal representative of the raising speed. A comparator 5' compares the detected speed signal with a desired speed pattern signal preset by a molding speed pattern generator 5 and applies a difference signal between the two signals to a driving device 7. A motor 8 is driven by the output of device 7 to control the opening of a valve 9. (A reference numeral 9' shows a valve for manually operating a stopper 12 to open or close a nozzle 12'.)

For this reason, a hydraulic cylinder 10 is actuated in response to the opening of the valve 9 to adjust opening of the nozzle stopper 12, so that a molding speed (the raising speed) can be controlled in accordance with a desired molding speed pattern.

Reference numeral 6 indicates an apparatus to detect the top position of the molten metal within the mold by obtaining the integrated value of the rising speed thereof. Thus integrated value is compared with a setting level to automatically detect a terminal time of molding. The output of the apparatus 6 produced at the terminal time is applied to the driving device 7 as a stop command to allow nozzle stopper 12 to close the nozzle 12'.

A Doppler speed meter 1, for example, comprises a microwave oscillator OSC, a combining circuit C and a switching circuit SW for transmitting $e_t$ to the antenna 2 and for deriving $e_r$ therefrom as shown in FIG. 1(b).

A digital circuit suitable for a raising speed detection meter employing the above mentioned Doppler speed meter will be described hereinafter.

Figure 3:
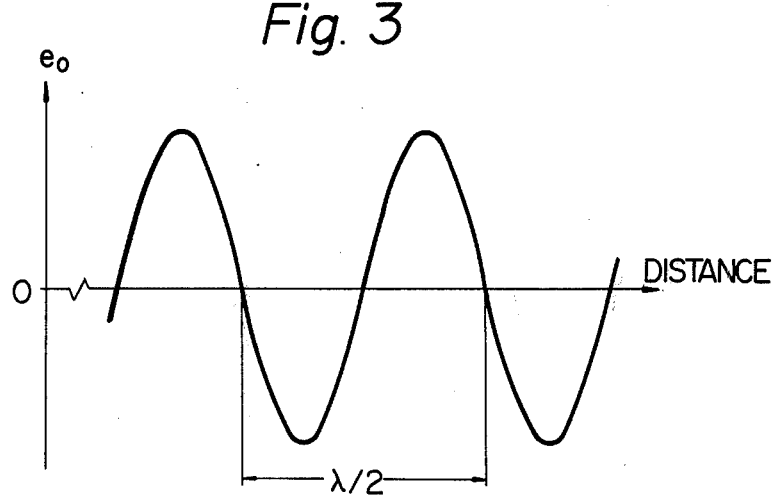

In making an ingot, the surface Y of the molten metal continuously rises and thus distance X continuously decreases. Now, if the rising speed of the molten metal surface is constant, the time-variation of $e_o$ becomes as shown in FIG. 3 wherein one cycle of a sine wave indicating $e_o$ occurs each time the molten metal surface raises by $\lambda/2$ $[m]$.

On the other hand, since the frequency of $e_o$ may be represented by equation (5) when $X$ varies, it is possible to know the height of the poured molten metal by accumulating the cycle numbers of $e_o$ from the beginning of molding and to know the molding speed by detecting the frequency of $e_o$, respectively.

Figure 4:
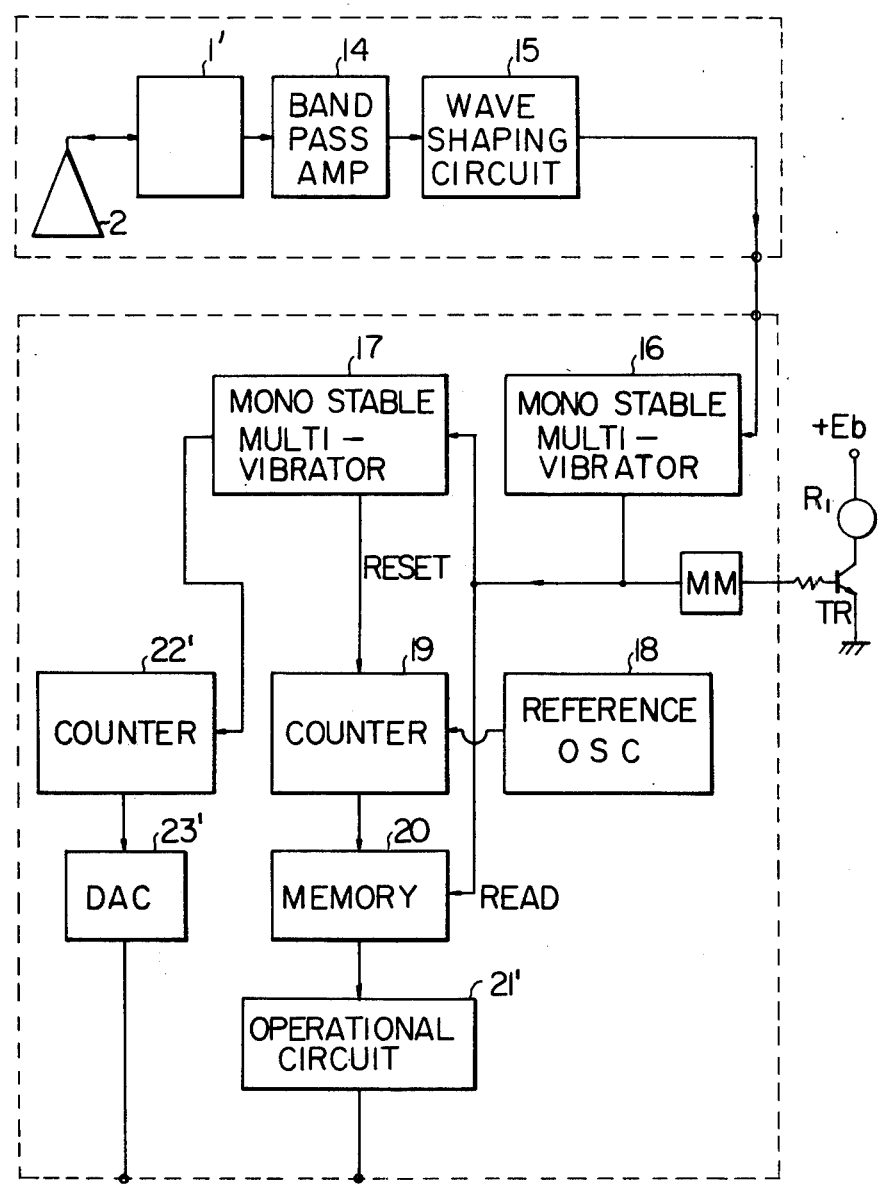
FIGS. 4 and 5 are block diagrams indicating examples of digital circuit arrangements of an operational circuit D shown in FIG. 1(b).

FIG. 4 shows a circuit arrangement for this purpose.

In FIG. 4, the combined output signal with the frequency $f_d$ from a Doppler speed meter 1' is amplified by a band-pass amplifier 14, the output signal of which is converted to a rectangular wave signal by a wave shaping circuit 15. A mono-stable multivibrator 16 is enabled with the rising portion of the rectangular wave signal to produce a pulse signal having very short width. Another mono-stable multivibrator 17 is enabled with the trailing part of the output pulse signal of the multivibrator 17 to provide a pulse signal with a very short width following it. Reference numerals 22' and 23' are a counter and a D to A converter constructing a circuit for measuring the height of the poured molten metal, which counts output pulses of the mono-stable multivibrator 17 from the beginning of molding, thereby to produce the height of the poured molten metal. Reference numerals 18, 19, 20 and 21 are circuits constructing a molding speed detecting circuit, in which a counter 19 counts the output signal of a reference oscillator 18 and is reset by the output pulse of the mono-stable multivibrator 17 every cycle of signal $e_o$ with the frequency $f_d$ and the content of the counter is set into a temporary memory 20 just before the resetting of the counter by means of the output pulse of mono-stable multivibrator 16 as a setting command, so that the cycle of the signal with the frequency $f_d$ may be detected every cycle thereof. Reference numeral 21' is a reciprocal number computing circuit for obtaining frequency $f_d$ from the detected cycles set in the temporary memory 20.

Figure 5:
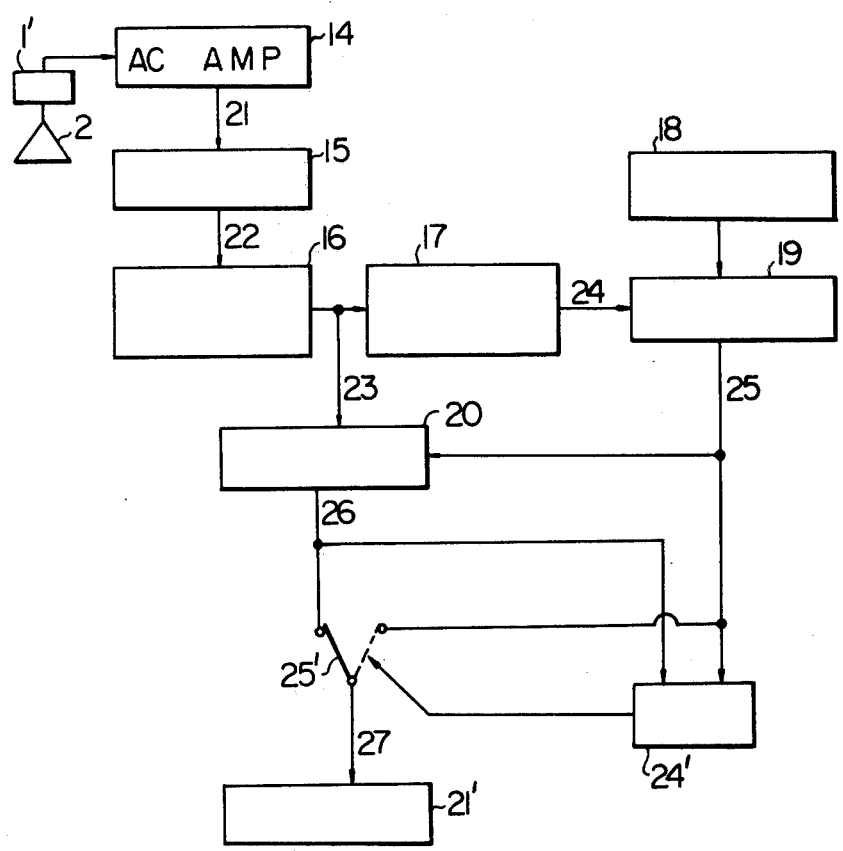

FIG. 5 shows a further improved embodiment of the invention capable of detecting the rising speed of molten metal even though it is very low. As is apparent from FIG. 5, there is further provided a comparator 24' and a switch 25' in addition to the apparatus shown in FIG. 4. The counted values in the temporary memory 20 and the counter 19 are applied to the comparator 24' and compared with each other. If the count value stored in the temporary memory 20 is larger than that in the counter 19, the switch 25' is actuated toward the side shown with the solid line in FIG. 5 by the output signal of the comparator 24' to supply the output of the temporary memory 20 to the reciprocal number computing device 21'.

On the other hand, if the counted value in counter 19 is larger than that in temporary memory 20, the switch 25' is actuated to the side shown with the dotted line in FIG. 5 to supply the output of the counter 19 to the reciprocal number computing device 21'. In this way, necessary amending operation is done by the comparator 24'. The reciprocal computing device 21' receives a detected cycle signal from the temporary memory 20 or the counter 19 to effect reciprocal operation thereby detecting the Doppler frequency.

Figure 6:
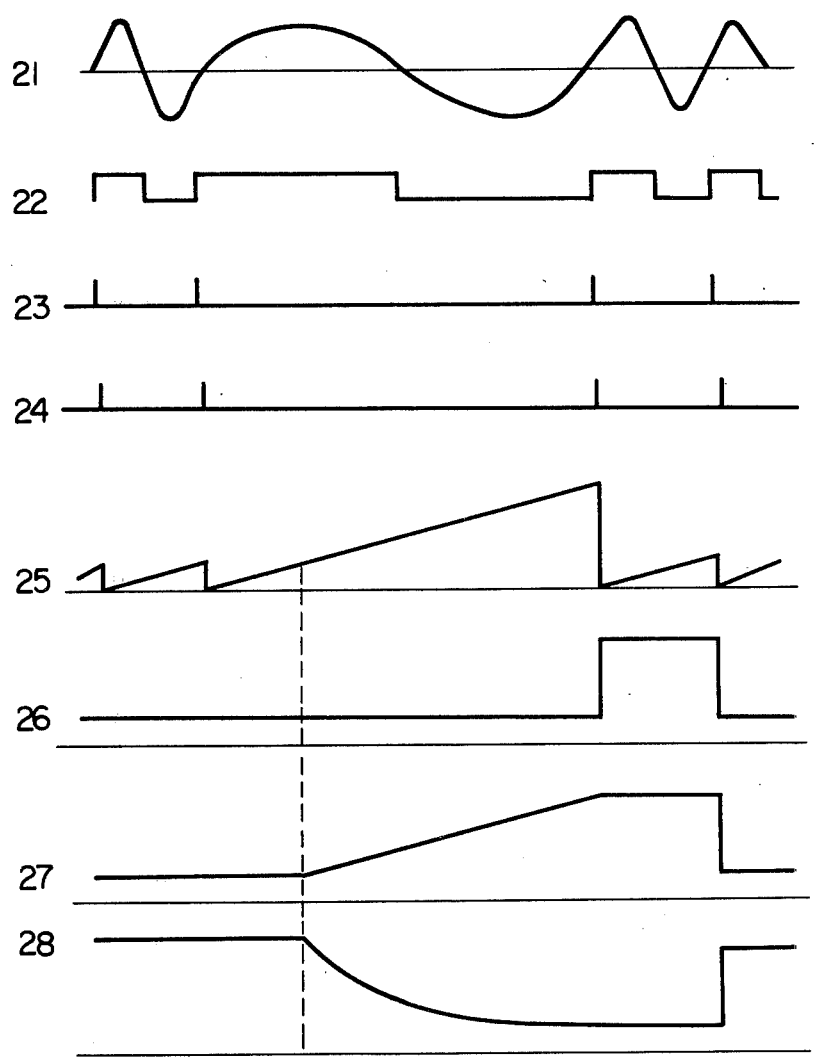
FIG. 6 illustrates time charts representing wave forms in each portion of the circuit shown in FIG. 5.

FIG. 6 shows wave forms 21 – 28 representing operation of the Doppler speed meter.

The apparatus shown in FIG. 5 is adapted to compare the counted value stored in the temporary memory with that in the counter by the comparator and to selectively carry out connection between the temporary memory or the counter and the reciprocal computing device. Accordingly, if the rising speed of the molten metal decreases, so that the counted value in the counter is larger than that in the temporary memory, since the cycle signal from the counter which is a computed value therein in the way in detecting operation, response is made fast to provide a detected speed signal in accordance with the substantial rising speed of the molten metal.

Figure 7A:
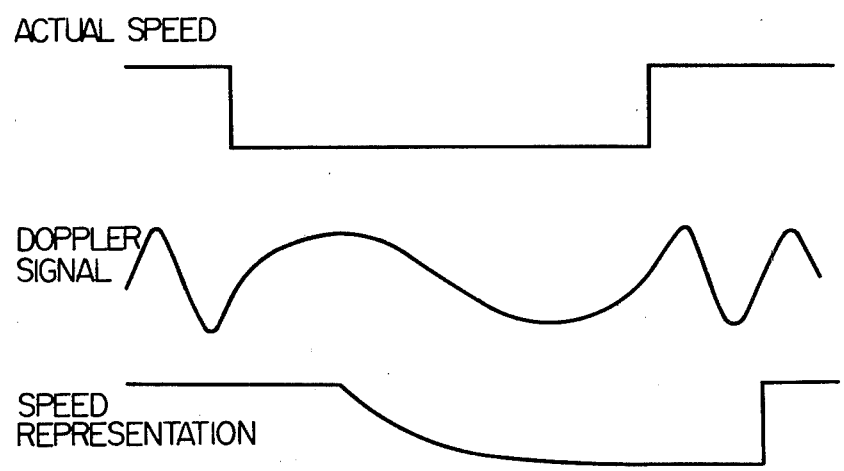
FIGS. 7(a) to (d) show wave forms explaining the effects provided by a circuit shown in FIG. 5.
Figure 7B:
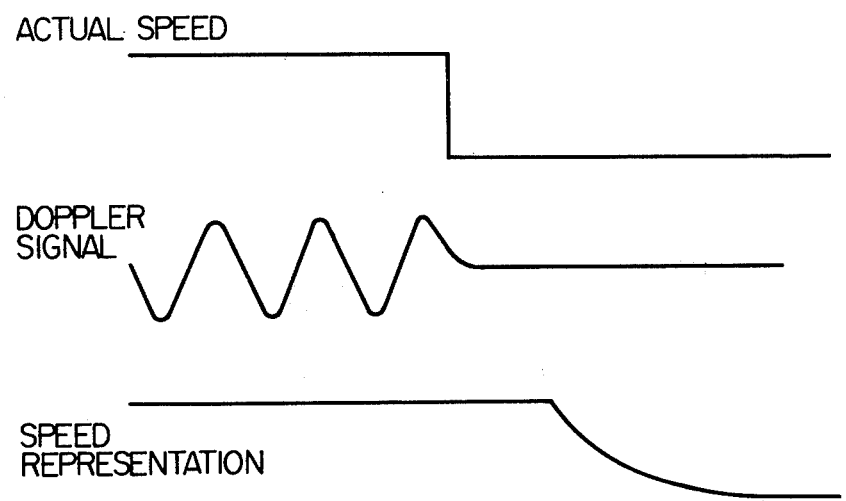
Figure 7C:
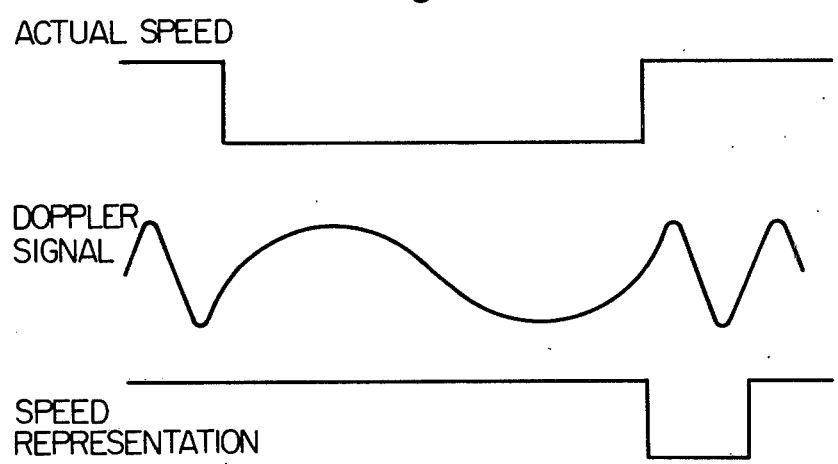
Figure 7D:
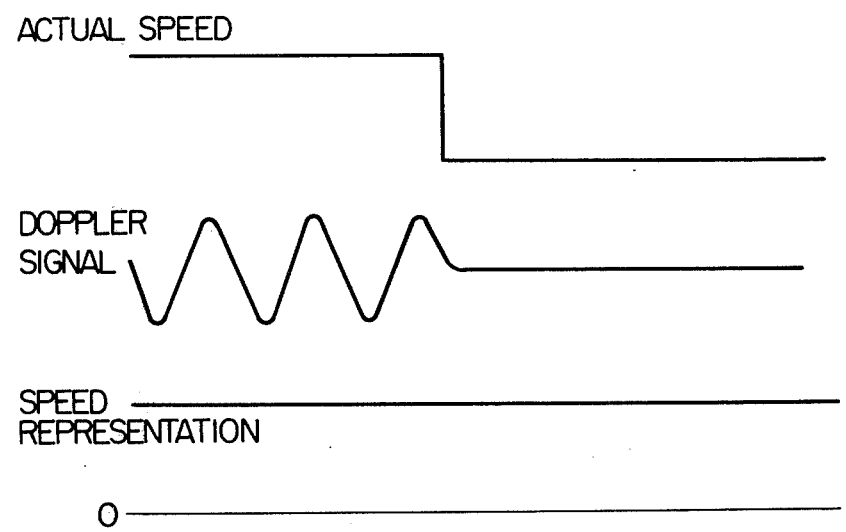

FIGS. 7(a) and (b) shows examples of the detected speed signal. It will be apparent from these figures that the circuit arrangement shown in FIG. 5 provides good speed response, as compared with those shown in FIGS. 7(c) and (d). In this case, though the value of the detected speed signal is not necessarily correct during the output of the counter, it is corrected because an error signal occurs at once even if the rising speed of the molten metal decreases to zero in applying the circuit arrangement to the automatic control for the molding speed, only little objection to this matter happens.

As described above, according to the circuit arrangement shown in FIG. 5, even though variation of the rising speed of the molten metal is extremely small, it can be detected accurately.

Figure 10:
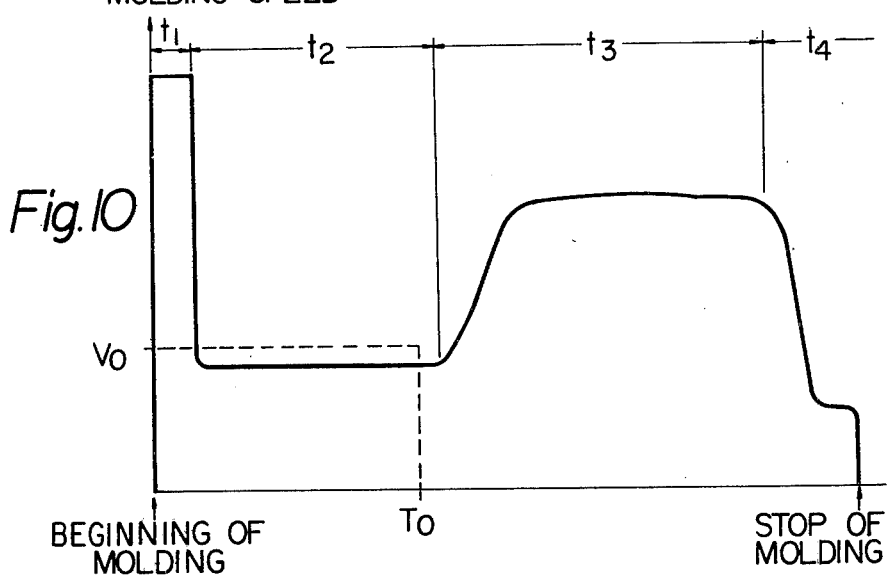
FIG. 10 shows a curve representative of an optimum molding speed pattern according to the invention.

FIG. 10 shows an optimum molding speed pattern from the beginning of molding to the termination thereof, namely variation of the raising speed of the molten metal within the mold relative to time desired to provide an ingot having good quality.

FIG. 10 indicates data actually measured on the basis of which the pattern is made.

In FIG. 10, a period $t_1$ is a short time during high speed molding provided to prevent the nozzle 12' from being stuffed up. A period $t_2$ begins at a time when there is no possibility of having the nozzle stuffed up (after about 30 seconds from the beginning of molding) and during this period molding is carried out at a speed below a crack occurring limit speed $V_o$. This period terminates at a time $T_o$ depending upon crack occurring limit molding height. During a period $t_3$ after time $T_o$, molding is done at a high speed to make production of an ingot efficient because after time $T_o$ the molding speed has little effect toward the occurrence of a crack. A period $t_4$ begins at a time when the surface of the molten metal reaches a given height and during this period the molding speed gradually slows down to accurately stop molding at a given position. When the surface of the molten metal reaches such position, molding is stopped. An ingot can be molded by effecting the molding as shown in FIG. 10 without substantially any cracks occurring.

Figure 11:
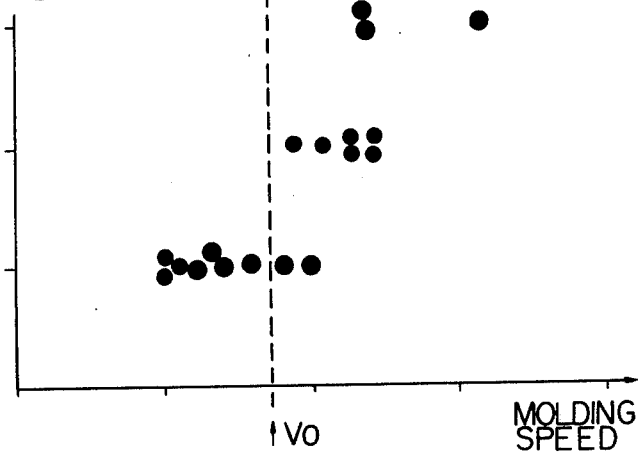
FIG. 11 is a diagram obtained by actually measuring the relation between molding speed and the number of lateral cracks occurring in an ingot.

FIG. 11 shows the relation between the molding speed and the occurrence of cracks with respect to 18 charges each having an ingot of 30 tons during the period $t_2$. It may be found from the FIG. 11 that there is a limit molding speed $V_o$ at which molding can be achieved without substantially any cracks occurring.

For example, in molding an ingot of 30 tons, the height of which is 2.8m, $T_o$ is a time period required for molding a portion thereof having a height of 1m and $V_o$ is 90 [mm/min.]. It is ascertained by several experiments that there is similar relation therebetween in molding various ingots of from 5 to 40 tons.

As will be seen from the foregoing, an ingot having good quality and few cracks can be obtained by controlling the molding speed in response to a pattern signal varying as shown in FIG. 10 from a molding speed pattern generator 5.

An automatic molding apparatus according to the invention may be so constructed as to have the arrangement such that a nozzle is caused to open and close intermittently with a constant period in response to a difference between the detected molding speed and the pattern speed, but in a case where the apparatus shown in FIGS. 4 or 5 is employed, it is required to take the following points into consideration.

Figure 8:
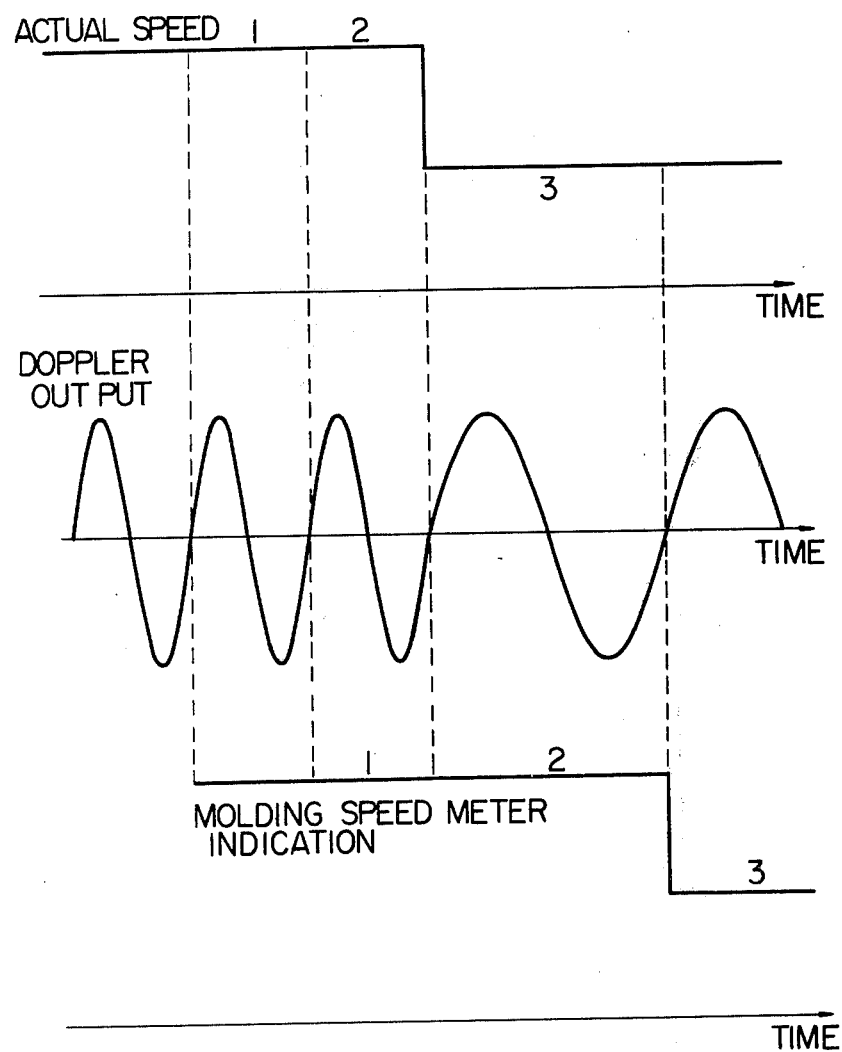
FIG. 8 shows wave forms explaining a time delay between an actual molding speed and a detected molding speed.

As shown in FIG. 8, there is time delay between a detected molding speed and an actual molding speed. For example, assuming that the values of the frequency $f$ of a microwave and of the actual molding speed ($dx/dt$) are 10 GHZ and 100 mm/min., respectively, this time delay $1/fd$ is 9 sec., where transmitting speed of the microwave is about $3 \times 10^8$ m/s.

In general, the time required to open and close the nozzle 12' is comparable to such time delay and is within a range from several seconds to several ten of seconds. Thus, if the molding speed is controlled by a simple on-off control system, stable control will not be attained.

On the other hand, in order to obtain stable operation, it is not desirable to reduce the on-off speed of the nozzle 12' from the following reasons:

i. In a case where a failure such as leakage of the molten metal from a mold occurs, it is required to close the nozzle at once and thus in this respect reduction of the on-off speed of the nozzle results in causing to make a failure to be even more disadvantageous.

ii. In the molding speed control, generally, from the beginning of molding to termination thereof, it is rarely carried out at a constant speed and the molding speed is varied frequently in the way of molding, so that it is necessary to maintain a certain response speed of the nozzle.

Figure 9:
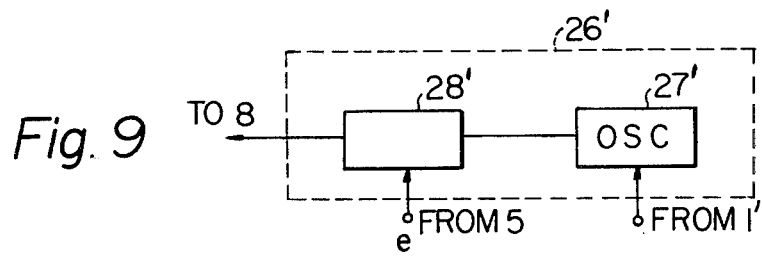
FIG. 9 is a block diagram indicating the example of a regulator in an automatic molding apparatus of the on-off control type according to the invention.

In view of such situation, an embodiment of the invention for effecting stable and high speed automatic molding of the molten metal is shown in FIG. 9 wherein a hydraulically driven sliding nozzle is employed as an example of a nozzle for controlling the rising speed of the molten metal but which is applicable to a nozzle driven by a motor.

In FIG. 9 a reference numeral 26' is a regulator comprising, for instance, a variable period pulse generator 27' and a pulse width modulator 28, and is adapted to provide an on-off command signal for causing a sliding nozzle to actuate in response to an error between the detected molding speed signal and the molding speed pattern signal and is characterized by the following to stably operate a control system at a high speed.

i. The regulator produces an operation command signal having three different values or levels, that is, a pulse command signal for causing a nozzle to open, close or not to operate in response to an error. (By providing a dead zone for an error, the regulator provides no control operation when the error is within the dead zone.)

ii. The duration time of an open signal or a close signal is proportional to the magnitude of the error. That is, both signals are subjected to pulse width modulation.

iii. The cycle of a pulse command signal is synchronized with the time delay of the detection of the molding speed or determined to be 2 – 5 times as long as the time delay thereof.

A hydraulic unit including a hydraulic pump and a control valve (not shown) maybe adapted to drive a hydraulic cylinder (not shown) in response to the output signal of said regulator 26, thereby to open or close a nozzle.

Figure 12:
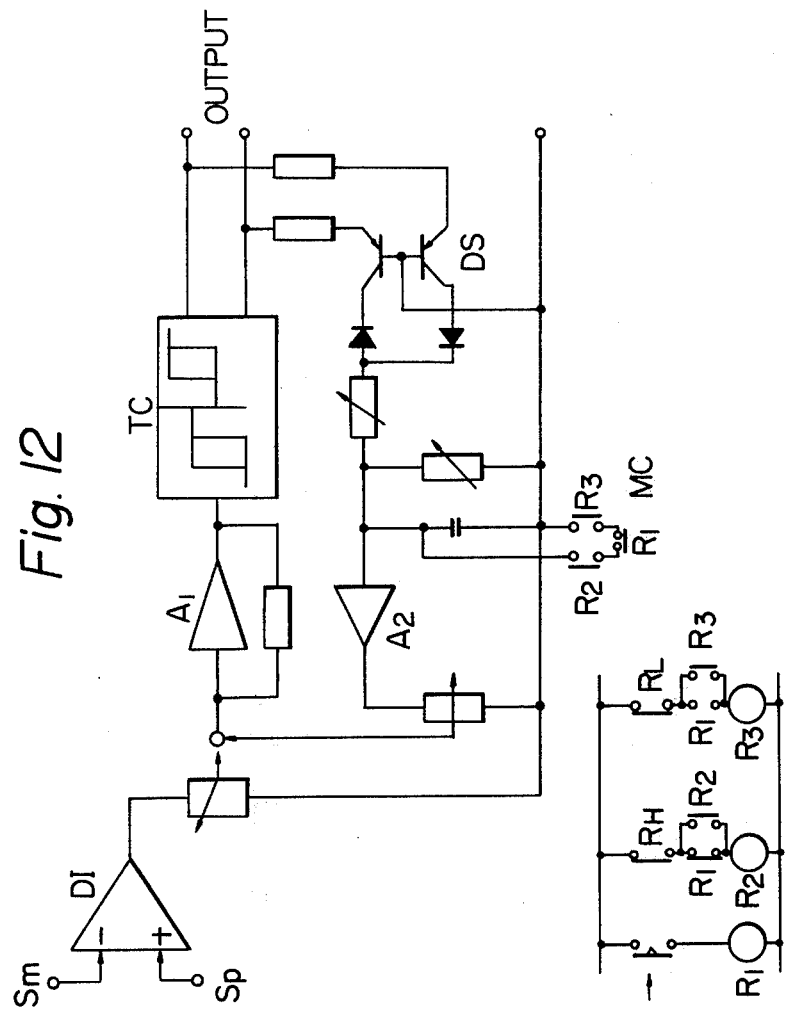
FIG. 12 shows a control system for effecting molding speed control by using an apparatus as shown in FIG. 9.

FIG. 12 shows a control system for effecting a molding speed control using the control system apparatus shown in FIG. 9. It may be found from the same figure that it is possible to provide a high speed and stable operation by properly selecting the error and the duration time.

The following table shows calculating conditions on the basis of which the simulation result is calculated:

| | |
|---|---|
| the diameter of the nozzle | 80 mm |
| the nozzle cylinder speed | 3 m/sec |
| the molding speed when the nozzle is closed | 200 mm/min |
| the nozzle control period | 30 sec |
| the frequency in the microwave molding speed meter | 10.525 GHZ |
| the time width of the command pulse per an error of 1 mm/min | |
| part 1 | 0.05 sec |
| part 2 | 0.075 sec |
| part 3 | 0.1 sec |

FIG. 12 shows an example of the pulse width modulator comprising a differential amplifier DI, a trigger circuit TC, a modulating switch circuit MC, a diode switch circuit DS, and amplifiers $A_1$ and $A_2$ wherein the detected molding speed signal Sm and the molding speed pattern signal Sp are applied to the negative and positive inputs of the differential amplifier DI for producing the error signal modulated by the modulating switch circuit MC, respectively. The modulating switch circuit MC is actuated by the output pulse of the mono-stable multivibrator 16 shown in FIG. 4, or for example, the output pulse supplied from a mono-stable multivibrator MM triggered by it through a transistor TR and a relay $R_1$.

As described above, according to the invention, the molten metal can be automatically molded in accordance with an optimum molding pattern and defects such as lateral cracks occurring in an ingot may be greatly reduced to thereby remarkably improve the quality of the ingot.

Figure 13:
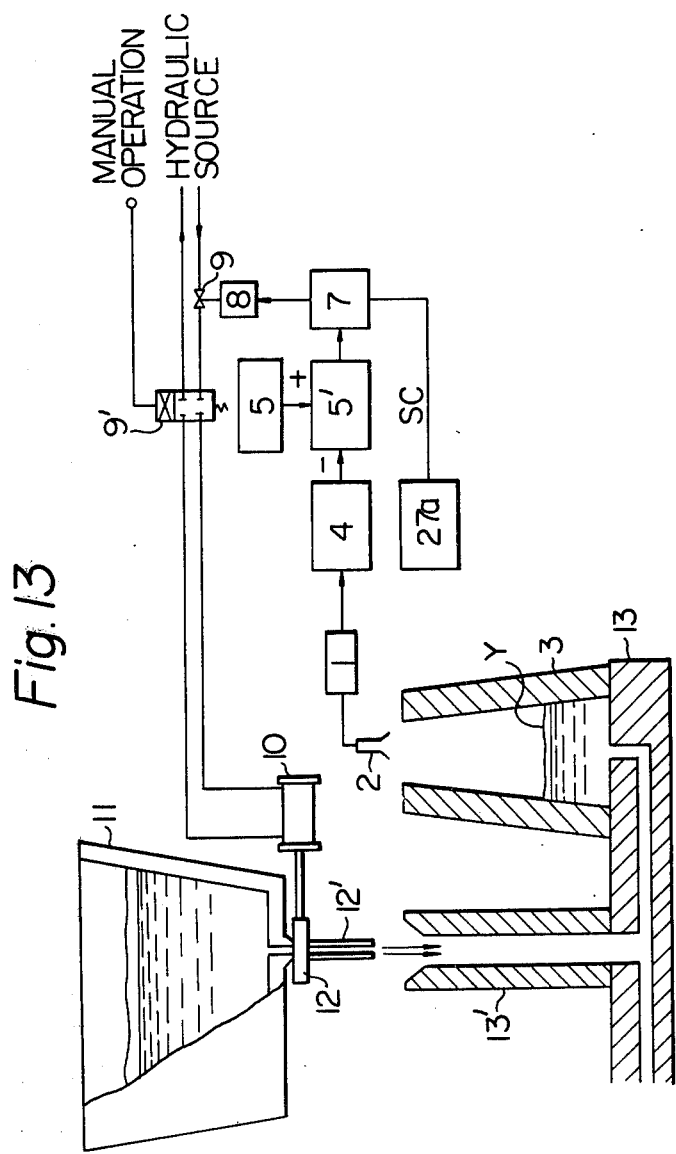
FIG. 13 is a view similar to FIG. 1, but showing another embodiment of the invention.
Figure 2:
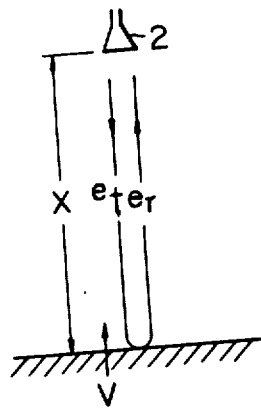
Figure 12:
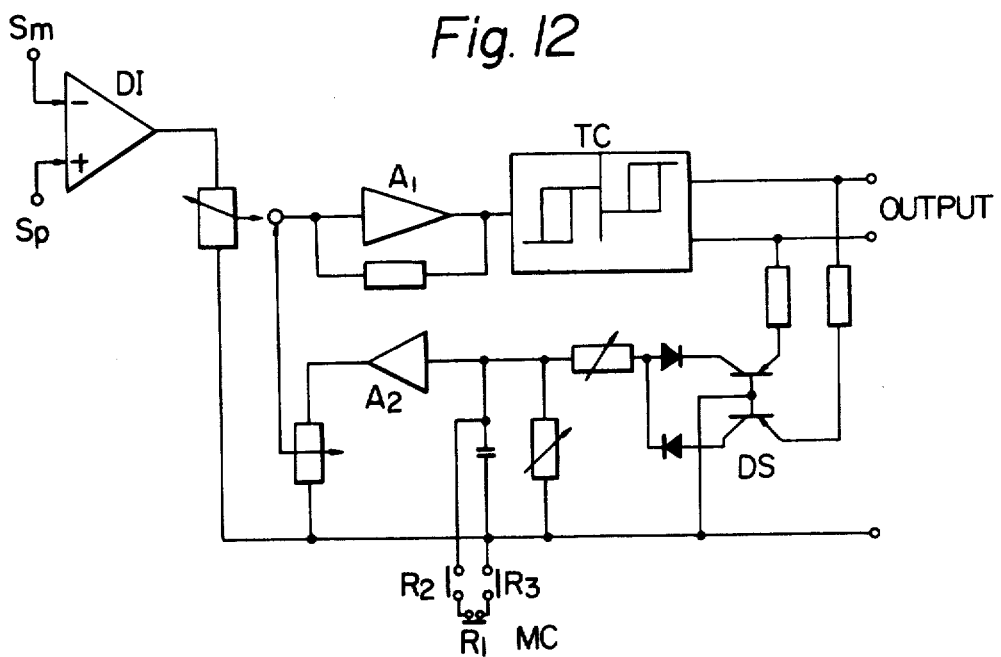

The invention is not limited to the above mentioned embodiments and many apparently widely different embodiments thereof may be made without departing from the spirit and scope thereof. For example, a speed meter utilizing a supersonic wave or rays as well as the microwave Doppler speed meter may be used as a detector for the molding speed. Also, in the embodiment shown in FIG. 1, the molding operation is stopped when an integrated value of the detected molding speed signal reaches a given value but in the case of using, for instance, the same mold and the same molding pattern, as shown in FIG. 13, the molding operation may be stopped by a stop command signal SC from a timer 27a when a given time has passed from the beginning of the molding.

Moreover, the embodiments shown in FIGS. 4 and 5 includes two mono-stable multivibrators but the invention is not limited to these and in short, any means capable of providing a reset signal synchronized with the Doppler frequency may be usable therein.

We claim:

1. An automatic molding apparatus comprising:
a container filled with molten metal;
a mold into which said molten metal is fed from said container;
said container having a nozzle through which said molten metal is fed to said mold;
said nozzle having stopper means for adjusting the quantity of said molten metal passing through said nozzle;
means for detecting the rate of increase of the level of said molten metal within said mold without contacting said mold, said detecting means comprising:
 a. first means for producing microwaves;
 b. second means for transmitting said microwaves to the surface of said molten metal within said mold and for receiving reflected microwaves from said surface of said molten metal;
 c. third means, operatively connected to said second means, for combining said transmitted and reflected microwaves and producing an output signal representative thereof; and
 d. fourth means for detecting the Doppler frequency of said output signal of said third means and for determining the rate of increase of said level as a function thereof, said fourth means comprising:
  i. a reference pulse generator;
  ii. a counter for counting reference pulses from said generator;
  iii. means for producing pulses synchronized with said Doppler frequency of said output signal of said third means;
  iv. means, connected to said counter and said pulse producing means, for resetting said counter by said synchronized pulses;
  v. temporary memory means for storing a counted output from said counter; and
  vi. means for computing said rate of increase of said level as a function of an output of said temporary memory and for producing a detected rising speed signal representative thereof;
means for producing a speed pattern signal representative of a desired molding speed pattern; and
means, connected to said stopper means and responsive to an error between said detected rising speed signal and said speed pattern signal, for controlling operation of said stopper means and therefore the quantity of said molten metal passing through said nozzle.

2. An apparatus as claimed in claim 1, wherein said synchronized pulse producing means comprises first and second mono-stable multivibrators; means for applying said combined output signal from said third means to the input of said first mono-stable multivibrator; means for supplying an output pulse of said first mono-stable multivibrator to the output of said second mono-stable multivibrator; means for feeding the output pulse of said counter to said temporary memory means to effect reading of counted reference pulses thereinto; and means for resetting said counter by the output of said second mono-stable multivibrator.

3. An apparatus as claimed in claim 2, further comprising a further counter for counting the output pulses of said second mono-stable multivibrator, and means for generating a signal representative of a position of the surface of said molten metal within the mold as a function of the output of said further counter.

4. An apparatus as claimed in claim 1, further comprising means for integrating said detected rising speed signal; and means for producing a command signal to close said nozzle to stop molding when the integrated value in said integrating means reaches a predetermined value and applying said command signal to said controlling means.

5. An apparatus as claimed in claim 1, further comprising at least one switch having two input terminals, and a comparator to which the reference pulse counted output and the output of said temporary memory are applied to actuate said switch in response to an output of said comparator, one each of the input terminals of said switch being connected to said temporary memory means and said reference pulse counter, respectively, the output terminal of said switch being connected to said rate computing means.

6. An apparatus as claimed in claim 1, wherein said controlling means includes means for actuating said stopper means to intermittently open and close said nozzle in response to said error; and means for synchronizing the cycle of such opening and closing with the cycle of said rate computing means.

7. An apparatus as claimed in claim 1, wherein said controlling means comprises means for actuating said stopper means to intermittently open and close said nozzle in response to said error, the cycle of such opening and closing operation being 2-5 times as long as the cycle of said rate computing means.

8. An apparatus as claimed in claim 1, wherein said controlling means includes a pulse generator; means for modulating the width of an output pulse from said generator in response to said error; and means for actuating said stopper means to intermittently open and close said nozzle by the modulated pulse from said modulating means.

9. An apparatus as claimed in claim 1, wherein said speed pattern signal has a maximum value within a given short time from the beginning of a molding operation, thereafter a value less than a critical value required to obtain an ingot having a predetermined good quality until the molten metal reaches a preset molding height within said mold and an intermediate value between said maximum and critical values after the molten metal reaches a preset molding height therein.

10. An apparatus as claimed in claim 1, further comprising a timer for providing an output signal when a predetermined time has passed, and means for applying said output signal from said timer to said controlling means to thereby close said nozzle.

11. An apparatus as claimed in claim 8, wherein the cycle of the output pulse of said pulse generator is synchronized with the cycle of said rate computing means.

12. An apparatus as claimed in claim 8, wherein the cycle of the output pulse of said pulse generator is 2-5 times as long as the cycle of said rate computing means.

* * * * *

UNITED STATES PATENT OFFICE
CERTIFICATE OF CORRECTION

Patent No. 4,019,562            Dated April 26, 1977

Inventor(s) Toshio Shiraiwa et al.

It is certified that error appears in the above-identified patent and that said Letters Patent are hereby corrected as shown below:

Figures 2 and 12 of the drawings should read as shown on the attached sheet.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*